United States Patent [19]

Thanivavarn

[11] Patent Number: 4,697,868

[45] Date of Patent: Oct. 6, 1987

[54] INTEGRATED OPTICAL WAVEGUIDE POLARIZER

[75] Inventor: Suwat Thanivavarn, Pasadena, Calif.

[73] Assignee: TRW Inc., Redondo Beach, Calif.

[21] Appl. No.: 764,693

[22] Filed: Aug. 12, 1985

[51] Int. Cl.[4] .................................................. G02B 6/10
[52] U.S. Cl. .................................................. 350/96.12
[58] Field of Search ............... 350/96.12, 96.13, 96.14, 350/96.11

[56] References Cited

U.S. PATENT DOCUMENTS

| | | | |
|---|---|---|---|
| 3,920,314 | 11/1975 | Yajima | 350/96.12 |
| 3,957,340 | 5/1976 | Giallorenzi | 350/96.14 |
| 4,006,964 | 2/1977 | Mahlein et al. | 350/96.12 X |
| 4,359,260 | 11/1982 | Reinhart et al. | 350/96.12 |

FOREIGN PATENT DOCUMENTS 59401  4/1983  Japan ................... 350/96.12

OTHER PUBLICATIONS

Kobayashi et al., Appl. Phys. Lett., 32(5), Mar. 1, 1978, "An Optical Waveguide TE-TM Mode Splitter", pp. 300-302.

Horimatsu et al., IOOC '81, Third International Conference on Integrated Optics and Optical Fiber Communications, San Fco., CA, U.S.A., Apr. 27-29, 1981, "TE/TM Mode Splitter Using an Intersecting Waveguide", pp. 68-69.

*Primary Examiner*—William L. Sikes
*Assistant Examiner*—Frank González
*Attorney, Agent, or Firm*—Noel F. Heal

[57] ABSTRACT

A single-mode optical waveguide polarizer for use in conjunction with electrooptical devices that operate best when presented with only a single polarization mode. The polarizer is fabricated on a conventional substrate, such as lithium niobate, using a waveguide strip of indiffused material, such as titanium. To achieve polarization discrimination, a polarizer section of the waveguide strip is made small enough in width to support only a single polarization mode, specifically the TM mode, but not the orthogonal TE mode. Losses are minimized by the use of tapered waveguide sections adjacent to the polarizer section.

6 Claims, 1 Drawing Figure

INTEGRATED OPTICAL WAVEGUIDE POLARIZER

BACKGROUND OF THE INVENTION

This invention relates generally to integrated optical circuitry and, more particularly, to optical waveguide polarizers. In recent years, devices have been developed to make use of an electrooptical effect in which an electric field induces a change in refractive index of an electrooptic crystal. An optical field propagating in a waveguide formed in the crystal is phase-modulated by the induced change in refractive index. The electooptical effect can be used, for example, in modulators and in switches.

When electrooptical devices are used in conjunction with optical fibers, as is typically the case, a problem arises concerning the polarization state of the propagating waves. It is well known that, when linearly polarized light is coupled into a single-mode fiber, the light becomes slightly randomized in polarization, and there is conversion from linear to elliptical polarization. When light emerges from the fiber, it is highly probably that both orthogonal polarizations, known as the transverse magnetic (TM) and transverse electric (TE) modes in planar waveguides, will be excited and will be coupled to an associated electrooptical device. Such devices process different polarizations with different efficiencies, and performance degradation results when both orthogonal polarizations are present.

Basically, there are three possible solutions to the problem. One is to use specially constructed polarization-preserving fibers, such as fibers of elliptical cross-section, but this is clearly an expensive solution. A second solution is construct electrootical devices that are polarization-independent. The third solution, and the one with which the present invention is concerned, is to interpose some type of polarizer between the fiber and the electrooptical device.

Prior to this invention, waveguide polarizers have been of two basic types. One type of polarizer employs a material such as a metal cladding to provide a differential attenuation with respect to the TE and TM modes of polarization. One mode is absorbed more than the other, to achieve the desired differential attenuation, but in practice even the desired mode is attenuated by the cladding. The other approach is to use an anisotropic overlay or "superstrate" over the waveguide. The overlay is selected to provide a more effective cladding material for one mode than for the other. Accordingly the propagated energy in one mode tends to be transmitted through the polarizer, while the energy in the other mode tends to leak out of the waveguide. Again, there is a likehood that even the desired mode will be attenuated by the polarizer.

It will be appreciated from the foregoing that there is still a significant need for a waveguide polarizer for use in conjunction with electrooptical devices. The present invention is directed to this end.

SUMMARY OF THE INVENTION

The present invention resides in an integrated optical waveguide polarizer that avoids the use of metal cladding layers of anisotropic "superstrates" on the waveguide. Basically, and in general terms, the polarizer of the invention includes a generally planar substrate, and an optical waveguide formed in the substrate, and having a polarizer section that attenuates transmission of one polarization mode without the use of claddings, overlays or other additional layers.

In the preferred embodiment of the invention, the polarizer section has a waveguide of smaller cross section than the waveguide sections outside of the polarizer section. In other words, the polarizer waveguide is selected to be so narrow as to be unable to support one mode, such as the TE mode, but the other mode will still be transmitted. In an alternative arrangement, instead of changing the width of the waveguide the refractive index differential of the guide is controlled during fabrication.

The specific mode selectivity of the polarizer depends on a variety of factors, including the substrate material and type of crystalline cut employed, the diffusion conditions used to form the waveguide in the substrate, the operating wavelength, and the width of the waveguide. By way of example, one of the most common substrate materials for electrooptical devices is lithium niobate ($LiNbO_3$), and the waveguide is typically formed by indiffusion of titanium (Ti). More specifically, if the operating wavelength is 1.3 microns, and the substrate is C-cut lithium niobate, a waveguide can be formed by indiffusion of titanium of an initial thickness of 450 A, at a temperature of approximately 1,000° C., and with a diffusion time of approximately 7 hours in an atmosphere of wet argon. With these parameters, a 7-micron-wide waveguide will support one TM mode and one TE mode of operation, but a waveguide with a width of 4–5 microns will support only the TM mode and not the TE mode. Accordingly, in the illustrative structure of the invention, the polarizer is 4 to 5 microns wide and the waveguide sections on either side of the polarizer section are at least 7 microns wide.

It will be apparent that the described embodiment of the invention functions as a TM-pass polarizer, effectively cutting off the TE polarization mode of operation. Other substrates and crystalline cuts can be used to form a TE-pass polarizer instead of a TM-pass polarizer.

Preferably, the effects of discontinuities in the waveguide are minimized by including a tapered section between the narrowed polarizer section and the adjacent waveguide sections.

It will be appreciated from the foregoing that the present invention represents a significant advance in the field of waveguide polarizers for use in conjunction with electrooptical devices. In particular, the invention eliminates one mode of polarization and passes an orthogonal mode, but without the use of metal cladding layers, or overlays of anisotropic material. Other aspects and advantages of the invention will become apparent from the following more detailed description, taken in conjunction with the accompanying drawings.

DESCRIPTION OF THE PREFERRED EMBODIMENT

Figure 1:
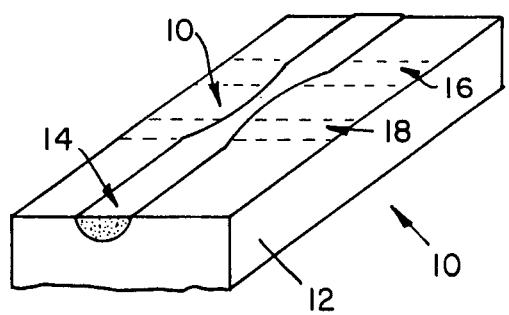
FIG. 1 is a simplified isometric view of an optical waveguide polarizer constructed in accordance with the invention.

As shown in the drawing for purposes of illustration, the present invention is concerned with waveguide polarizers, which in the past were implemented using metal cladding layers or anisotropic overlays. There is a need for a polarizer of simple construction, for use with electrooptic devices, such as modulators and switches, which are significantly degraded in performance when excited at different polarization modes. Unfortunately, most optical fibers output two orthogonal polarization modes, and one approach to solving this problem is to provide a waveguide polarizer at the input to every electrooptical device.

In accordance with the invention, a polarizer section, indicated generally by reference numeral 10, is integrated into a conventional waveguide structure that has a substrate 12 and a diffused waveguide strip 14. The substrate 12 is of a material used in electrooptical devices, such as lithium niobate ($LiNbO_3$). The waveguide strip 14 may be of indiffused titanium (Ti), for example. The interface between the substrate 12 and the waveguide strip 14 has a refractive index differential that guides propagated light within the strip. Moreover, there is a refractive index differential between the strip 14 and surrounding air, such that the air also acts as a cladding material.

The polarizer section 10 has the width of the waveguide strip substantially reduced. The reduced width is selected to be too narrow to support the transmission of one polarization mode, such as the transverse electric (TE) mode, but to allow an orthogonal mode, such as the transverse magnetic (TM) mode, to pass with only minimal losses.

Losses resulting from sharp transitions in waveguide width are minimized by tapering the waveguide strip 14, as indicated at 16 and 18. In prior polarizers for the same purpose, where metal cladding or anisotropic overlays are used, discontinuities in the effective refractive index are also introduced by the polarizer. Moreover, these discontinuities have an influence on both polarization modes. In the embodiment of the invention described, the only discontinuities introduced are those related to spatial mode confinement, and these may be kept to a minimum level by use of the tapered transition sections 16 and 18.

Another approach to achieve polarization discrimination is to vary the differential refractive index of the waveguide in the polarizer section 10. This may be achieved, for example, by changing the initial titanium thickness and producing a waveguide strip in which the refractive index varies along the length of the waveguide.

EXAMPLE

A single-mode waveguide polarizer is fabricated on a C-cut lithium niobate substrate. The waveguide strip is formed by indiffusing an initial thickness of 450 Å of titanium, at a diffusion temperature of 1,000° C. and in a wet argon atmosphere. The diffusion time is approximately seven hours and the operating wavelength of the device is 1.3 microns. A 7-micron-wide strip will support one TM mode and one TE mode. The polarizer section 10 is reduced to 4-5 microns in width, which will support only the TM mode but not the TE mode. Therefore, the polarizer section will operate as a polarizer to cut off the TE mode and pass the TM mode.

By appropriate selection of material, crystalline cut, and dimensional parameters, other polarizer sections can be designed to operate at selected wavelengths and to pass a selected polarization mode.

An important advantage of the invention is that it is truly integratable with other guided wave optical components, and can be built into any desired optical device as a polarization controller. Another advantage is that it conveniently provides a TM-pass mode of operation that is desirable in most electrooptical devices. Most other types of polarizers operate in a TE-pass mode.

It will be appreciated from the foregoing that the present invention represents a significant advance in the field of optical waveguide polarizers for use in conjunction with electrooptical devices. In particular, the structure of the invention passes a selected polarization mode without the need for metal cladding layers or anisotropic layers. It will also be appreciated that, although a particular embodiment of the invention has been described in detail for purposes of illustration, various modifications may be made without departing from the spirit and scope of the invention. Accordingly, the invention is not to be limited except as by the appended claims.

I claim:

1. An integrated optical waveguide polarizer, comprising:
   a generally planar substrate; and
   an optical waveguide strip formed in the substrate, and having a polarizer section that attenuates transmission of one polarization state without the use of claddings or other additional layers, the polarizer section having a waveguide strip of reduced width selected to inhibit operation in one polarization state but to transmit in the other polarization state with only minimal losses.

2. An integrated optical waveguide polarizer as defined in claim 1, in which:
   the substrate is lithium niobate; and
   the waveguide strip is formed in the substrate by the diffusion of titanium.

3. An integrated optical waveguide polarizer as defined in claim 2, in which:
   the substrate is C-cut lithium niobate.

4. An integrated optical waveguide polarizer as defined in claim 3, in which:
   the operating wavelength is approximately 1.3 microns;
   the waveguide strip is approximately 7 microns wide in regions outside the polarizer section; and
   the waveguide strip in the polarizer section is approximately 4-5 microns wide, to support only a TM polarization mode but not a TE polarization mode.

5. An integrated optical waveguide polarizer as defined in claim 4, and further including:
   a tapered section of waveguide strip on each side of the polarizer section, to minimize transition losses induced by the presence of the polarizer section.

6. An itegrated optical waveguide polarizer as defined in claim 1, and further including:
   a tapered section of waveguide strip on each side of the polarizer section, to minimize transition losses induced by the presence of the polarizer section.

* * * * *